Figure 1:
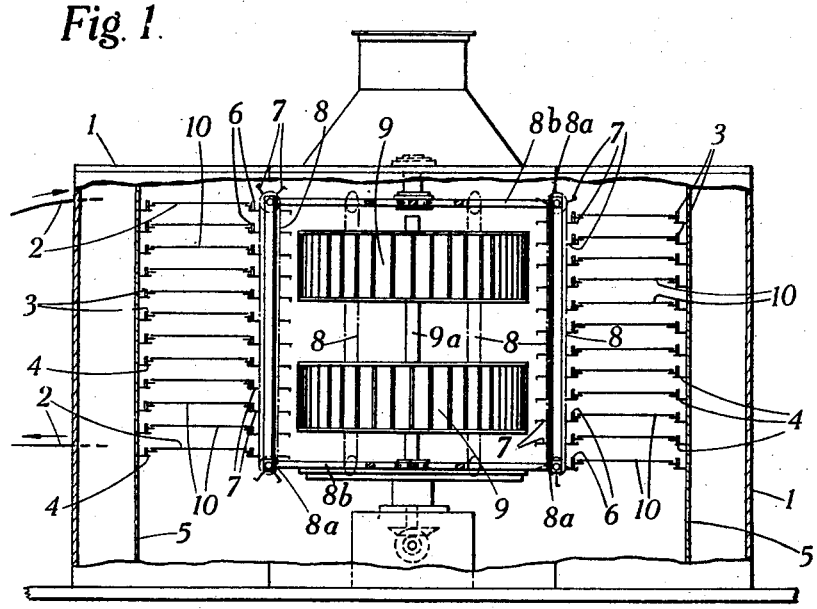

Sept. 14, 1937.  K. GLINKA  2,093,270

APPARATUS FOR DRYING OR OTHERWISE TREATING MATERIALS

Filed Dec. 29, 1936  6 Sheets-Sheet 1

INVENTOR
Karl Glinka
BY
Gill & Jennings
ATTORNEYS

Sept. 14, 1937. K. GLINKA 2,093,270
APPARATUS FOR DRYING OR OTHERWISE TREATING MATERIALS
Filed Dec. 29, 1936 6 Sheets-Sheet 2

INVENTOR
Karl Glinka
BY
Gill & Jennings
ATTORNEYS

Sept. 14, 1937.  K. GLINKA  2,093,270
APPARATUS FOR DRYING OR OTHERWISE TREATING MATERIALS
Filed Dec. 29, 1936   6 Sheets-Sheet 3

INVENTOR.
Karl Glinka
BY
Gill & Jennings
ATTORNEYS

Sept. 14, 1937.  K. GLINKA  2,093,270
APPARATUS FOR DRYING OR OTHERWISE TREATING MATERIALS
Filed Dec. 29, 1936  6 Sheets-Sheet 4

INVENTOR
Karl Glinka
BY
Gill & Jennings
ATTORNEYS

Sept. 14, 1937.   K. GLINKA   2,093,270
APPARATUS FOR DRYING OR OTHERWISE TREATING MATERIALS
Filed Dec. 29, 1936   6 Sheets-Sheet 6

INVENTOR
Karl Glinka
BY
Gill & Jennings
ATTORNEYS

Patented Sept. 14, 1937

2,093,270

UNITED STATES PATENT OFFICE 2,093,270

APPARATUS FOR DRYING OR OTHERWISE TREATING MATERIALS

Karl Glinka, Uerdingen-on-the-Rhein, Germany, assignor to The Buell Combustion Company, Limited, London, England, a company of Great Britain Application December 29, 1936, Serial No. 118,106
In Germany June 21, 1933

19 Claims. (Cl. 34—42)

This invention relates to apparatus for subjecting materials to treatments of various kinds, such as drying, cooling, oxidation or calcination, and is particularly applicable to the drying of materials which have to undergo a very long drying process.

When very delicate materials have to be dried, it is important that they should be heated uniformly and pass very slowly through the drying apparatus, so that it is essential to have an extremely long drying path. Moreover, if for example, a wilting or withering process has to be carried out on vegetable matter, such as tea leaves and so forth, the duration of the treatment can never really be sufficiently protracted. If the material to be dried is carried on a continuous belt, which may be assumed to travel at a speed of about 10 metres per minute and the required drying time is approximately 1½ hours, the forms of drying apparatus hitherto available are quite unsuitable for use in a manufacturing process. The reason is that in the example just mentioned approximately 900 metres of belt would have to be accommodated in the drying apparatus.

The object of the present invention is to provide an improved form of apparatus in which the material to be dried or otherwise treated is itself in the shape of a continuous belt, or is carried on an endless belt, which is arranged in such a way that an unusually long length of belt can be accommodated in a relatively small space.

According to the present invention, the material to be dried or otherwise treated is carried on an endless belt, or is itself in the form of a belt, which is arranged throughout most of its length in the form of a helix of such a small pitch that each turn of the helical surface carrying the material is almost horizontal. An example of material which is itself in the form of a belt, and to which this novel principle may be applied, is of course represented by lengths of cinematographic film. This could be unwound from a reel, passed through a drying chamber in which it is arranged in the manner just specified, and then be reeled up again upon leaving the drying chamber. It is to be noted in this connection that it makes no substantial difference, so far as the invention is concerned, whether the belt is actually formed without ends or whether it is of such length or is provided in such manner that it will pass helically through a treating chamber as if it had no end, and that the terms "endless belt", and the like, as used herein are to be so understood. When used for drying purposes, an arrangement in accordance with the invention ensures a very high drying capacity per hour even in cases where the drying time has to be very protracted. Preferably an endless belt is arranged to carry the material to be dried into the top of a drying chamber within which the belt is arranged in helical fashion, as mentioned above, and to deliver it in a dried condition at the bottom of the chamber. Means for effecting progressive lowering of the turns of the belt may be provided inside the drying chamber. For example, the outer periphery of the turns of the belt may be supported on rails arranged vertically one above the other, and the inner periphery of the turns may be supported by vertically disposed endless chain arrangements or equivalent devices which are driven so as to effect lowering of the turns.

One form of drying apparatus in accordance with the invention comprises a rotary cage or framework mounted inside a drying chamber so as to rotate about a vertical axis, an endless chain wound around the cage in the form of a helix of small pitch and driven by engagement with projections on the outside of the cage, and plates or trays which are attached to the chain and constitute sections of the belt for carrying the material to be dried. One or more fans are provided inside the rotary cage for the purpose of blowing hot air over the material. Of course this apparatus may be used for subjecting materials to treatments other than drying.

In order that the invention may be clearly understood and readily carried into effect, some examples of construction of drying apparatus in accordance therewith will now be described with reference to the accompanying diagrammatic drawings, in which:—

Figure 2:
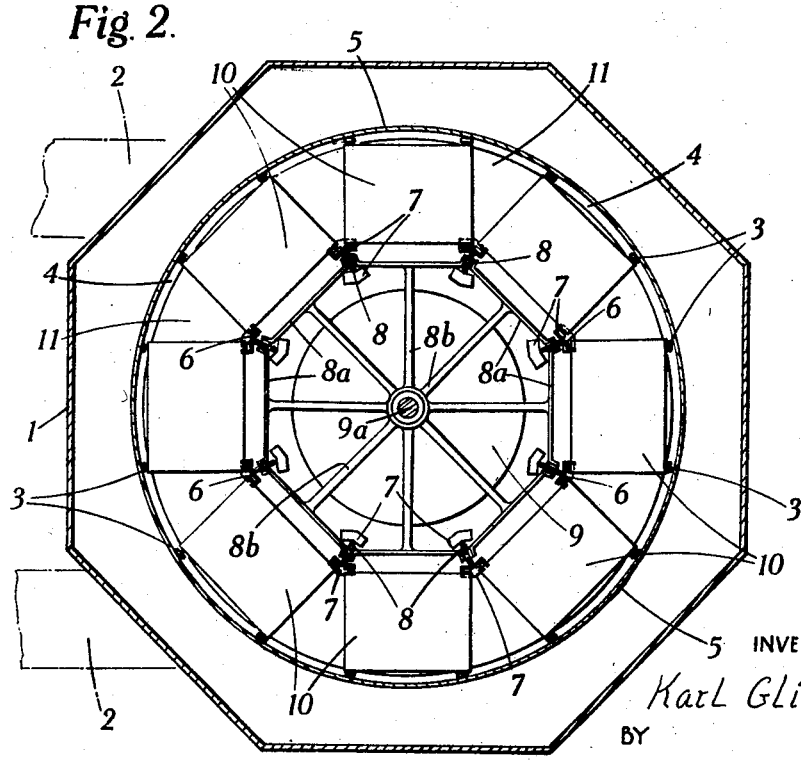
Figure 3:
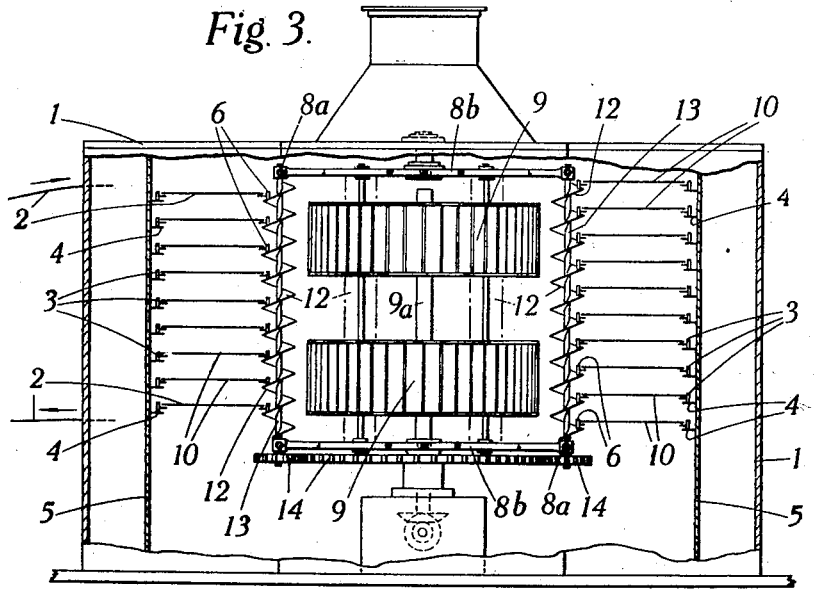
Figure 4:
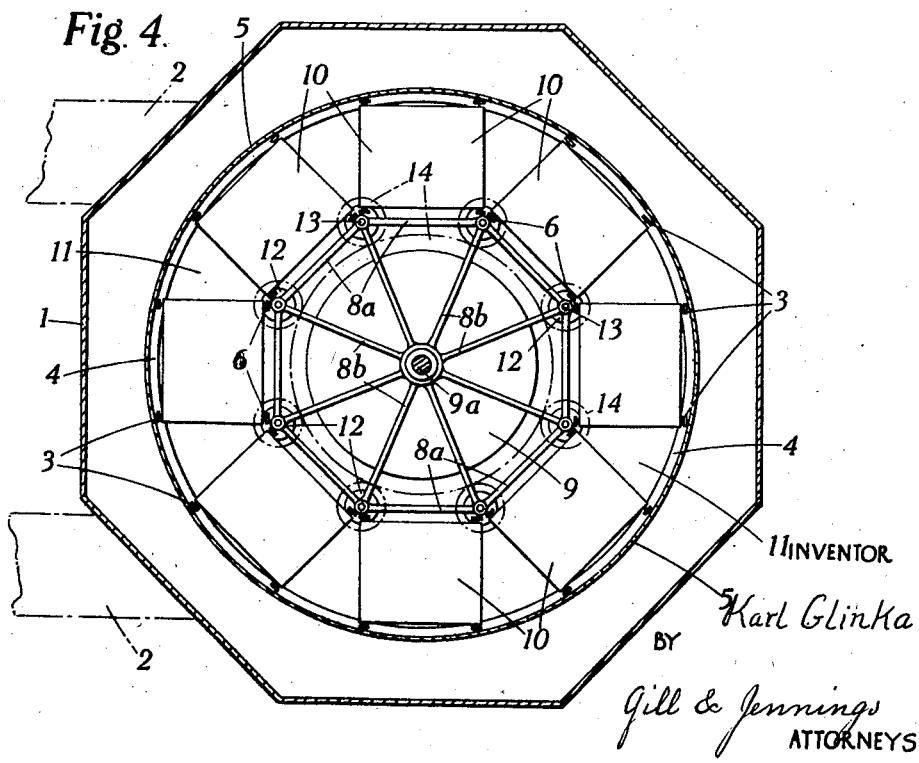
Figure 5:
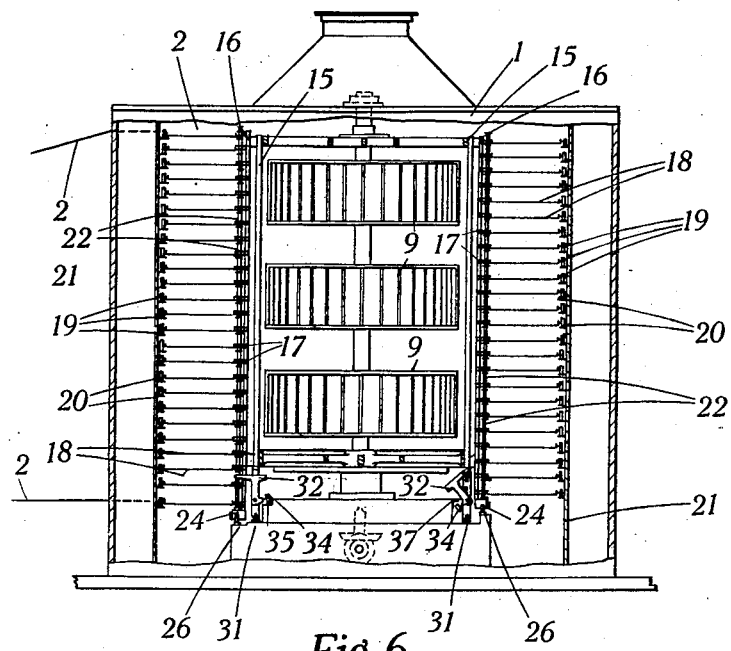
Figure 6:
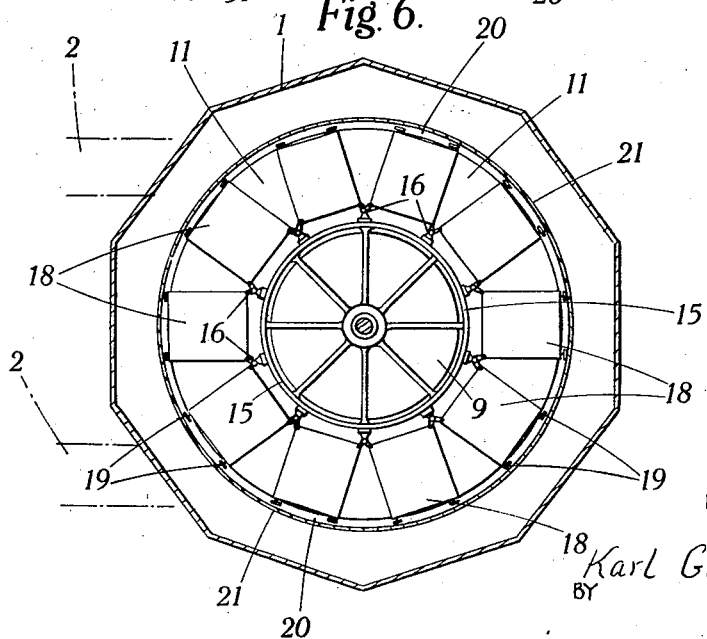
Figure 7:
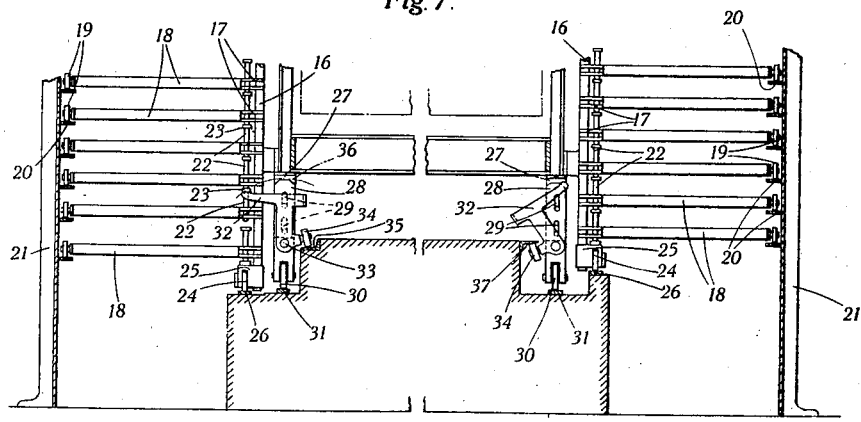
Figure 8:
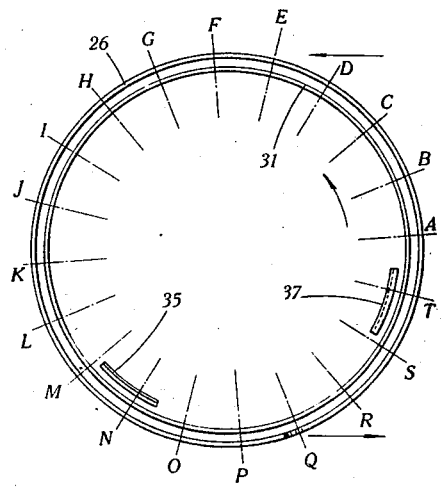
Figure 9:
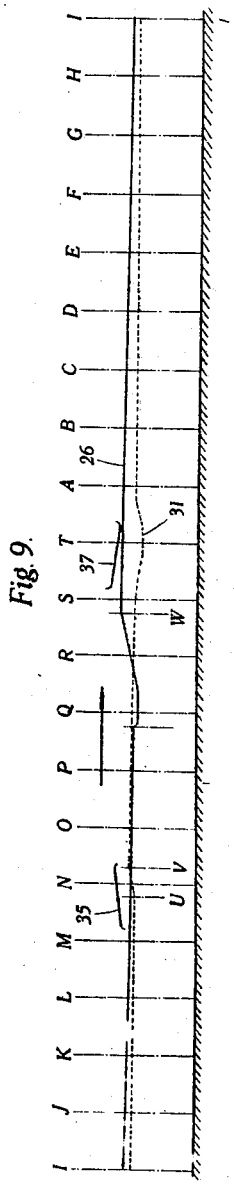
Figure 10:
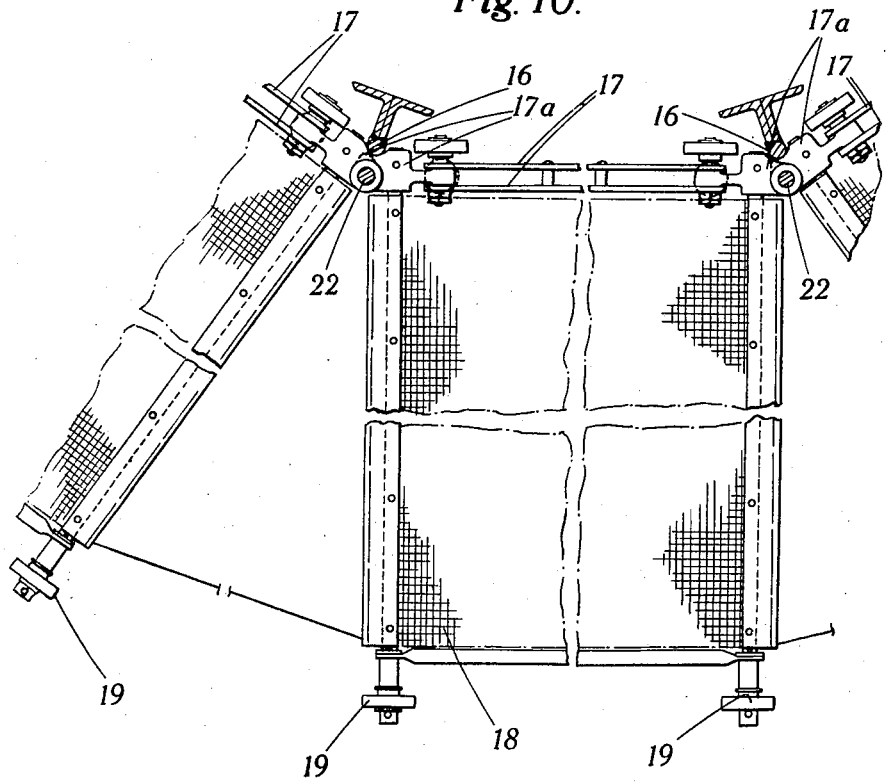
Figure 11:
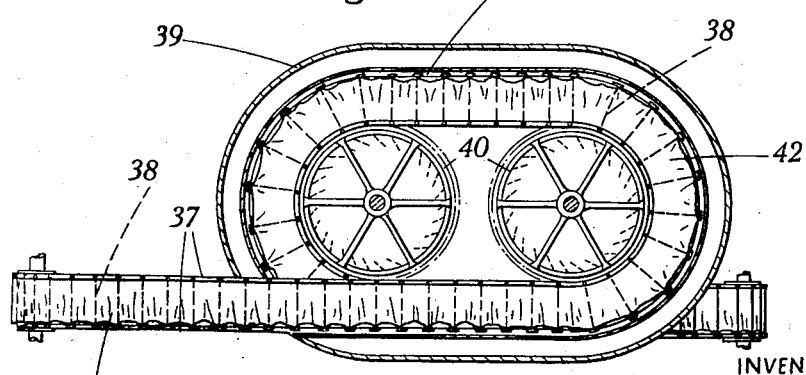

Figures 1 and 2 represent respectively a sectional elevation and plan of one form of construction, Figures 3 and 4 are corresponding views of a modified construction, Figure 5 is a sectional elevation showing a further form of construction, Figure 6 is a plan of the arrangement shown in Figure 5, Figure 7 is an enlarged detail view of the arrangement near the bottom of Fig. 5, Figure 8 is a plan of part of the arrangement shown in Fig. 7, Figure 9 is a development, in elevation, showing the paths followed by certain of the parts seen in Figs. 7 and 8, Figure 10 is an enlarged fragmentary plan view showing the construction and arrangement of the endless belt, and Figure 11 is a plan view of a further form of drying apparatus in accordance with the invention.

Referring first to Figures 1 and 2, the apparatus has a drying chamber 1 containing an endless belt 2 arranged in the form of a helix and by which the material to be dried is carried into the drying chamber at the top and eventually deliverd at the bottom. It will be noticed that the pitch of the helix is so small that the surface of the belt on which the material rests is almost horizontal, so that there is no risk of the material falling off and moreover a great length of belt is accommodated in a relatively small space. The outer edges of the helically arranged belt are fitted with rollers 3 which run on rails 4 fixed to the inside of a cylindrical supporting frame 5. The inner edges of the turns of the belt are fitted with rollers 6 which rest on uniformly spaced supports 7 carried by vertically disposed endless chains 8 which are carried by a rotary cage 8a and are arranged at intervals around the inner periphery of the belt 2, as shown in Figure 2. The chains 8 are driven at a uniform speed so as to effect the lowering of the turns of the belt 2 as this travels through the drying chamber. The belt is driven by its engagement with the supports 7 on the chains 8 which, in turn, are carried round by the rotary cage 8a which is supported by radial arms 8b. The drying is effected by means of fans 9 and the drive for the endless chains 8 is preferably derived from a central vertical shaft 9a which drives the fans.

As can be seen from Figure 2, the endless belt 2 is not made of one continuous piece of material, but is composed of sections or trays 10 having spaces 11 between them which are approximately in the shape of sectors.

The arrangement shown in Figures 3 and 4 is very similar to that just described, but differs in regard to the mechanism for lowering the turns of the belt as the latter travels helically through the drying chamber. In this case the rollers 6 fitted to the inner periphery of the turns of the belt rest on helical surfaces 12 carried by vertically disposed spindle 13 which are driven by gearing 14 from the fan shaft 9a. The result of this arrangement is that when the conveyor belt 2 travels through the drying chamber it is lowered progressively turn by turn owing to the rotation of the helical supporting surfaces 12 which are, in effect, vertically disposed endless conveyors. Here the belt is driven by engagement with the parts 12 which are carried round the drying chamber by the rotary cage 8a.

In the arrangement shown in Figures 5 and 6, the conveyor belt 2 is piled up to form what is virtually a self-contained helical column, and there are no devices such as are provided in the previously described constructions for effecting progressive lowering of the turns of the belt at its inner periphery. The arrangement may best be understood by considering Figs. 5 and 6 in conjunction with the enlarged fragmentary view shown in Fig. 7. The fans 9 are enclosed within a rotary cage 15 fitted with a number of external and vertically disposed rods 16 spaced uniformly around the periphery of the cage. An endless chain, composed of links 17, is round helically around the framework formed by the rods 16, the chain entering the drying chamber at the top and leaving it at the bottom. When the cage revolves, the chain moves around with it just like a chain going round a sprocket. The chain links 17 are omitted from Fig. 6 for the sake of clearness, but they are shown clearly in Fig. 10. The end of each link 17 is fixed to a member 17a which is loosely mounted on the bolt 22. The inner edges of the members 17a are recessed as shown in order to engage the driving rods 16. The length of each chain link 17 corresponds to the distance between each pair of rods 16, and each belt section, consisting of a plate or shallow tray 18 which carries the material to be dried, is secured at its inner edge to a link of the chain. The trays 18 are conveniently made of wire mesh as shown in Fig. 10. The outer edge of each of the trays 18 is fitted with two rollers 19, one at each end of the tray, these rollers running on fixed, helically arranged rails 20 carried on the inside of a cylindrical support 21. The pitch of the helix formed by the rails 20 is of course so small that the belt sections remain very nearly horizontal in their passage through the drying chamber.

The chain links 17, as shown in Figs. 7 and 10 are interconnected by bolts 22 which bear upon one another and keep the inner edges of the trays the required distance apart in the vertical direction. The bolts 22 accordingly take the weight of the trays, and the latter form a self-contained helical column. Each of the bolts is provided with a head 23, the purpose of which will be described later.

The rods 16 are each fitted with a roller 24 mounted in a trolley 25 which is free to slide vertically on the rod 16, the rollers 24 running on a helical track 26, the nature of which will be clear from Figs. 8 and 9. The weight of the entire belt column is mostly borne by the rollers 24, the rails 20 taking part of the load. Now since the belt sections or trays 18 enter the drying chamber at the top and leave it at the bottom, it is necessary to take the weight of the belt column off the lowermost tray 18 so that it can leave the drying chamber without any load on it. The lowest position of the helical column, viz., the lowest part of the track 26, is between the points P and Q marked in Figs. 8 and 9. This is the place where the belt leaves the drying chamber, and as shown in Fig. 9 the track 26 falls abruptly at this point. The result is that the roller 24 moves downwardly into the position shown in Fig. 7.

The bottom of the rotary cage 15 is fitted with downwardly extending members 27 the number of which corresponds to the number of belt sections or trays 18 in one turn of the helical belt column. Each of the members 27 carries a bar 28 which is slotted at 29 so that it can slide up and down on the member 27. The bars 28 are supported on rollers 30 which run on a track 31 (see also Figs. 8 and 9). As each tray 18 approaches the outlet from the drying chamber it is freed from the weight of the superposed belt column by means of a lever 32 which is pivoted at 33 on the bar 28. This lever is tilted into the position shown on the left hand side of Fig. 7 owing to its roller 34 riding up a short cam rail 35, the final (upright) position of the lever being limited by a stop (not shown). The tilting of the lever 32 is commenced in good time so as to ensure that the lever is already in position before the bolt head 23 comes into contact with it. In this position the end of the lever engages underneath the bolt head 23 and takes the weight of the belt column off the lowermost tray 18, the belt column being lowered on to the lever as a result of the roller 24 running down the inclined track 26. This track continues to slope downwardly until the sudden dip between P and Q (Fig. 9) is reached, but the track 31 is horizontal over this interval. As a result the lowermost tray 18 can readily pass out of the drying chamber.

When the lever 32 tilts about its pivot 33 the end of its supporting arm describes a circular arc 36, and this is why the support 28 has to be lowered so much before the lever is swung round (see point U in Fig. 9). After the lever has been tilted into the supporting position the lever support 28 is raised until it arrives at the point V (Fig. 9), and thereafter the helical belt column is lowered on to the supporting arm of the lever. As soon as the trolley 25 has passed the discharge point between P and Q it is raised again by the track 26 until it is close below the chain bolt 22 which is still being supported by the lever 32. This happens at the point marked W in Fig. 9, and from here the track 31 begins to slope downwards more. Consequently the belt column is lowered on to the trolley 25 which carries the column again until it arrives at the sudden dip between P and Q, whereupon the cycle of operations is repeated. When the trolley 25 has taken over the support of the belt column again (shortly after the point W) the support 28 is further lowered by the track 31 to such an extent that the lever 32 can be swung out freely by a cam rail 37 into the position shown at the right hand side of Fig. 7. The lever then remains in this position under the action of gravity until it encounters the cam rail 35.

In Fig. 6, as in the case of Figs. 3 and 4, sector-shaped spaces 11 are left between the sections 18 of the conveyor belt. These spaces may be avoided by guiding the belt in the way described above, not at its inner periphery but at its outer periphery, by arranging the rotary cage 15 outside the belt and by making the sections 18 in the shape of sectors. With belt sections of this shape the guiding of the belt could also be effected at its inner periphery as shown in the drawings, but then of course when the sections of the belt left the drying chamber and proceeded in a straight line they would have to telescope one into the other, or the longer edges would have to pass one above the other.

In the modified arrangement shown diagrammatically in Figure 11, a chain 37 having transverse supporting bars 38 is arranged in the form of an elongated helix inside a drying chamber 39 provided with two rotary cages or drums 40 containing fans (not shown). The outer periphery of the chain 37 is supported on guide rails 41 which are also arranged in the form of an elongated helix. The inner periphery of the chain 37, as will be seen, is disposed around a portion of the outside of each of the rotary cages, bridging the space between the same. The material to be dried is spread out on a continuous belt 42 which is placed on the supporting bars 38 of the chain so that the belt hangs in shallow festoons between the bars, and it can accordingly be moved round the curves without disturbance. As in the other arrangements described above, the pitch of the helix formed by the chain 37 is so small that each turn of the chain is almost horizontal. In this form of construction, the feeding of fresh material on to the belt is effected either before or upon the entry of the belt into the upper part of the drying chamber, and the dried material is removed at the bottom of the chamber. The chain 37 which carries the belt is driven by engagement with projections (not shown) on the rotary cages 40 similar to the projecting rods 16 of the arrangement shown in Fig. 7.

Although in the examples of construction described above the conveyor belt moves in a helical path through the drying chamber with the material to be dried spread out on the belt, it is not always necessary that the belt should be moved during the drying process. Thus, it is within the invention to arrange the conveyor belt in the form of a helical column in the drying chamber, as described above, and to allow the belt to remain stationary while the material is drying. In this case, it would simply be necessary to modify the feed and discharge of the material.

I claim:—

1. An apparatus for subjecting materials to treatments of the kinds specified, comprising a treating chamber, an endless conveyor belt for supporting the material to be treated and arranged to travel progressively through said chamber, the major portion of the length of said conveyor belt being arranged within said chamber in the form of a helix of such flat pitch that the turns thereof are substantially horizontal, a plurality of vertically-extending supporting devices within said chamber for supporting and progressively lowering the turns of said belt at one side thereof, said supporting devices being caused to rotate about the vertical axis of said chamber, and means constructed and arranged to support the turns of said belt at its other side and to lower said other side of the belt at substantially the same time that said one side is lowered as the belt travels thru said chamber.

2. An apparatus for subjecting materials to treatments of the kinds specified, comprising a treating chamber, a rotary framework mounted within said chamber for rotation about a vertical axis, an endless chain wound around the outside of said framework in the form of a helix of small pitch and moving with said framework, said framework and said chain being so formed as to permit vertical movement of the chain with respect to said framework while in contact with said framework, a plurality of belt sections for carrying material to be treated attached to said chain, and means constructed and arranged to so support the turns of said chain that it will move vertically with respect to said framework as the framework rotates.

3. An apparatus for subjecting materials to treatments of the kinds specified, comprising a treating chamber, a rotary framework mounted within said chamber for rotation about a vertical axis, an endless chain wound around the outside of said framework in the form of a helix of small pitch and moving with said framework, said framework and said chain being so formed as to permit vertical movement of the chain with respect to said framework while in contact with said framework, a multiplicity of trays for carrying material to be treated attached to the links of said chain, said trays projecting substantially horizontally outwards from said chain links, and means constructed and arranged to so support the turns of said chain that it will move vertically with respect to said framework as the framework rotates.

4. An apparatus for subjecting materials to treatments of the kinds specified, comprising a treating chamber, a rotary cage mounted within said chamber to rotate about a vertical axis, an endless chain wound around the outside of said cage in the form of a helix of small pitch, projections on the outside of said cage engaging with said chain, said projections and said chain being so formed as to permit vertical movement of the chain with respect to said framework while in contact with said projections, a multiplicity of belt sections for carrying material to be treated attached to said chain and projecting substantially horizontally outwards therefrom, said belt sections entering said chamber at the top and leaving it at the bottom, and means constructed and arranged to so support the turns of said chain that it will move vertically with respect to said framework as the framework rotates.

5. An apparatus for subjecting materials to treatments of the kinds specified, comprising a treating chamber, a rotary cage mounted within said chamber to rotate about a vertical axis, an endless chain wound around the outside of said cage in the form of a helix of small pitch, projections on the outside of said cage engaging with said chain, and a multiplicity of trays for supporting material to be treated attached to the links of said chain and projecting substantially horizontally outwards from said chain links, the length of each of said chain links corresponding to the spacing between said projections.

6. An apparatus for subjecting materials to treatments of the kinds specified, comprising a treating chamber, a rotary framework mounted within said chamber for rotation about a vertical axis, an endless chain wound around the outside of said framework in the form of a helix of small pitch and moving with said framework, a supporting rail inside said chamber also arranged in the form of a helix of small pitch, a plurality of belt sections for carrying material to be treated, the inner side of each of said belt sections being attached to a link of said chain, and rollers mounted on the outer side of each of said belt sections, said rollers running on said supporting rail.

7. An apparatus for subjecting materials to treatments of the kinds specified, comprising a treating chamber, a rotary framework mounted within said chamber for rotation about a vertical axis, an endless chain wound around the outside of said framework in the form of a helix of small pitch and moving with said framework, a supporting rail inside said chamber also arranged in the form of a helix of small pitch, a plurality of belt sections for carrying material to be treated, the inner side of each of said belt sections being attached to a link of said chain, rollers mounted on the outer side of each of said belt sections, said rollers running on said supporting rail, trolleys arranged to travel in a circular path beneath said rotary framework, and a multiplicity of superposed bolts supported on each of said trolleys and serving to space apart and support the belt sections in the vertical direction.

8. An apparatus for subjecting materials to treatments of the kinds specified, comprising a treating chamber, a rotary framework mounted within said chamber for rotation about a vertical axis, an endless chain wound around the outside of said framework in the form of a helix of small pitch and moving with said framework, a supporting rail inside said chamber also arranged in the form of a helix of small pitch, a plurality of belt sections for carrying material to be treated, the inner side of each of said belt sections being attached to a link of said chain, rollers mounted on the outer side of each of said belt sections, said rollers running on said supporting rail, a helical track located beneath said rotary framework, trolleys running on said track and serving to support said belt sections, and vertically disposed rods fixed to said rotary framework, said trolleys being free to slide vertically on said rods.

9. An apparatus for subjecting materials to treatments of the kinds specified, comprising a treating chamber, a multiplicity of belt sections for carrying material to be treated, said belt sections being so arranged within said chamber as to constitute a vertically disposed helical column of such flat pitch that the turns thereof are substantially horizontal, means to support the individual turns of said helical column so that each turn is maintained in spaced relationship to each other turn, means to cause said belt sections to travel progressively through said chamber, and means for relieving each of said belt sections, as it is about to leave said chamber, of the weight of the superposed belt sections.

10. An apparatus for subjecting materials to treatments of the kinds specified, comprising a treating chamber, a multiplicity of belt sections for carrying material to be treated, said belt sections being so arranged within said chamber as to constitute a vertically disposed helical column of such flat pitch that the turns thereof are substantially horizontal, a rotary cage mounted to rotate about a vertical axis within said chamber and surrounded by said helical column, projections on said rotary cage engaging with said belt sections to cause them to travel progressively through said chamber, and a pivoted lever device for relieving each of said belt sections, as it is about to leave said chamber, of the weight of the superposed belt sections.

11. An apparatus for subjecting materials to treatments of the kinds specified, comprising a treating chamber, a multiplicity of belt sections for carrying material to be treated, said belt sections being so arranged within said chamber as to constitute a vertically disposed helical column of such flat pitch that the turns thereof are substantially horizontal, a rotary cage mounted to rotate about a vertical axis within said chamber and surrounded by said helical column, projections on said rotary cage engaging with said belt sections to cause them to travel progressively through said chamber, a pivoted lever device mounted on said rotary cage, and a cam arrangement acting to tilt said lever device into the operative position in which it takes the weight of said helical column off the lowermost of said belt sections which is about to leave said chamber.

12. An apparatus for subjecting materials to treatments of the kinds specified, comprising a treating chamber, a multiplicity of belt sections carrying material to be treated, said belt sections being so arranged within said chamber as to constitute a vertically disposed helical column of such flat pitch that the turns thereof are substantially horizontal, a rotary cage mounted to rotate about a vertical axis within said chamber and surrounded by said helical column, projections on said rotary cage engaging with said belt sections to cause them to travel progressively through said chamber, a pivoted lever device mounted on said rotary cage, a cam arrangement acting to tilt said lever device into the operative position in which it takes the weight of said helical column off the lowermost of said belt sections which is about to leave said chamber, and a second cam arrangement acting to tilt said lever device into the inoperative position after said lowermost belt section has left said chamber.

13. A drying apparatus comprising a chain arranged in the form of a vertically disposed helix of such flat pitch that the turns thereof are substantially horizontal, a generally helical track, transverse bars fitted to said chain and extending outwardly from said chain, means at the outer ends of said bars and adapted to run on said track, and a continuous belt carrying material to be dried supported by said bars.

14. A drying apparatus comprising a drying chamber, a chain arranged within said drying chamber in the form of a vertically disposed helix of elongated cross-section and of such flat pitch that the turns thereof are substantially horizontal, a generally helical track, transverse bars fitted to said chain and extending outwardly from said chain, means at the outer ends of said bars and adapted to run on said track, a continuous belt carrying material to be dried supported by said bars, means for causing said chain to travel progressively through said drying chamber, and means within said helix for blowing air on to said material.

15. Apparatus for treating materials comprising a vertically-disposed generally-helical track; material-carrying means extending toward one end of the helix of said track, generally helically along said track, and away from the other end of said helix; means to mount one edge-portion of said material-carrying means for movement along said track; means to mount the other edge-portion of said material-carrying means; means rotatable on a vertical axis to move said material-carrying means in the direction of the turns of said track; and a plurality of means rotating with said rotatable means and also having a movement of their own and adapted to support the second mentioned mounting means at spaced points in each turn and at continuously vertically-changing points during said rotation.

16. Apparatus for treating materials, comprising a substantially enclosed treating chamber, a generally-helical track spiralling downwardly within said chamber, material-carrying means extending in a substantially endless manner into, through, and out of said chamber and extending helically substantially interiorly of said track, means to mount the exterior of said material-carrying means on said track, said mounting means comprising means adapted to run on said track, means to mount the interior of said material-carrying means, means including rotatable means to support said interior mounting means and to cause said interior mounting means to be lowered, driving means, and means including said driving means and said supporting means to cause said material-carrying means to move along said track and be maintained in a substantially horizontal position while it moves therealong.

17. Apparatus for treating materials comprising a vertically-disposed generally-helical track; material-carrying means extending toward the helix formed by said track, generally helically along said track, and away from said helix; means to movably mount one edge-portion of said material-carrying means on said track; means to mount the other edge-portion of said material-carrying means; driving means; means driven by said driving means to propel said material-carrying means along said track, and means movable with said propelling means and adapted to support the mounting means for the other edge-portion of said material-carrying means for movement in a vertical direction during the propelling action so as to maintain said material-carrying means substantially horizontal during its movement along said track.

18. Apparatus for treating materials comprising a vertically-disposed generally-helical track; material-carrying means extending toward the helix formed by said track, generally helically along said track, and away from said helix; means to movably mount one edge-portion of said material-carrying means on said track; means to mount the other edge-portion of said material-carrying means; driving means; means driven by said driving means to propel said material-carrying means along said track, and means forming a part of said propelling means and adapted to provide for the mounting means of said other edge-portion at the individual turns of the material-carrying means an individual support at points which are continuously lower as the propelling means moves said material-carrying means along said track so as to maintain said material-carrying means substantially horizontal during its movement along said track.

19. Apparatus for treating materials comprising a treating chamber, a rotary framework mounted within said chamber for rotation about a vertical axis, an endless chain wound around at least a portion of the outside of said framework and arranged in the form of a helix of small pitch moving with said framework, said framework and said chain being so formed as to permit vertical movement of the chain with respect to said framework while in contact with said framework, material-carrying means associated with said chain and moving therewith, and means constructed and arranged to so support the turns of said chain that it will move vertically with respect to said framework as the framework rotates.

KARL GLINKA.